(12) United States Patent
Parry et al.

(10) Patent No.: US 8,382,430 B2
(45) Date of Patent: Feb. 26, 2013

(54) AEROENGINE

(75) Inventors: Anthony Brian Parry, Derby (GB);
Nicholas Howarth, Derby (GB); Mark David Taylor, Ashbourne (GB)

(73) Assignee: Rolls-Royce PLC, London (GB)

( * ) Notice: Subject to any disclaimer, the term of this patent is extended or adjusted under 35 U.S.C. 154(b) by 797 days.

(21) Appl. No.: 12/449,196

(22) PCT Filed: Feb. 6, 2008

(86) PCT No.: PCT/GB2008/000401
§ 371 (c)(1),
(2), (4) Date: Oct. 22, 2009

(87) PCT Pub. No.: WO2008/096124
PCT Pub. Date: Aug. 14, 2008

(65) Prior Publication Data
US 2010/0047068 A1    Feb. 25, 2010

(30) Foreign Application Priority Data

Feb. 10, 2007    (GB) .................................. 0702608.1

(51) Int. Cl.
*B64C 11/48*    (2006.01)
(52) U.S. Cl. .......... 416/1; 416/128; 416/201 R; 416/203
(58) Field of Classification Search .............. 416/1, 128, 416/201 R, 203; 415/65, 66, 68, 119
See application file for complete search history.

(56) References Cited

U.S. PATENT DOCUMENTS

| 2,126,221 | A | * | 8/1938 | Sessums | ........................... 416/1 |
| 3,747,343 | A | | 7/1973 | Rosen | |
| 4,131,387 | A | | 12/1978 | Kazin et al. | |
| 4,883,240 | A | | 11/1989 | Adamson et al. | |
| 4,958,289 | A | * | 9/1990 | Sum et al. | ........................ 701/99 |
| 5,054,998 | A | * | 10/1991 | Davenport | ........................ 416/1 |
| 2010/0206982 | A1 | * | 8/2010 | Moore et al. | .................... 244/62 |

FOREIGN PATENT DOCUMENTS

| EP | 1 340 903 A2 | 9/2003 |
| GB | 2 175 652 A | 12/1986 |
| GB | 2 179 706 A | 3/1987 |
| GB | 2 254 661 A | 10/1992 |

OTHER PUBLICATIONS

Magliozzi; "Noise Characteristics of Model Counter-Rotating Prop-Fans;" *AIAA 11th Aeroacoustics Conference*; 1987; pp. 1-13; No. AIAA-87-2656; Sunnyvale, CA.

* cited by examiner

*Primary Examiner* — Ninh H Nguyen
(74) *Attorney, Agent, or Firm* — Oliff & Berridge, PLLC

(57) ABSTRACT

A method of operating a contra-rotating propeller engine that preferably comprises a 12 bladed front and a 9 bladed rear propeller. As is conventional, the engine is operated during at least a take-off phase, a cruise phase and an approach phase; during the cruise phase the engine operates with a generally constant propeller tip speed. The method is characterized by the step of operating the engine such that the tip speed of either or both of the propellers, during at least one of take-off, climb or approach, at least 10% greater than cruise tip speed. With a specific front to rear propeller spacing, increasing the tip speed reduces overall noise generated by the propellers.

12 Claims, 3 Drawing Sheets

Fig.2.
30
23,24
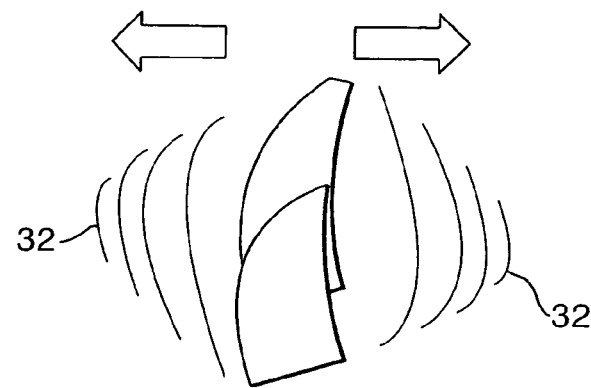
Fig.3.
32
32
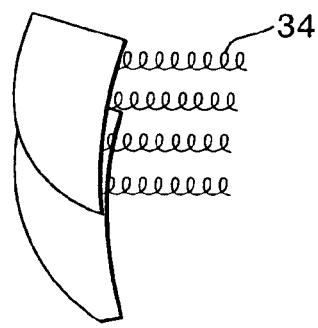
34

AEROENGINE

The present invention relates to a gas turbine engine having contra-rotating propeller arrays particularly, but not exclusively, comprising different numbers of blades and specific spacing between arrays for noise reduction. The present invention also relates to a method of operating a contra-rotating propeller engine for noise reduction.

One disadvantage of open rotor turbine engines for aircraft propulsion is a noise penalty when compared to ducted fan gas turbine engines that have acoustic treatment within the duct.

U.S. Pat. No. 4,883,240 discloses a contra-rotating pair of aircraft propellers that produces noise in the form of a frequency-modulated carrier wave. The frequency modulation allows a designer to manipulate the energy spectrum of the noise in order to, for example, place much of the acoustic energy into inaudible frequency ranges. This is achieved by the contra-rotating propellers comprising: (a) a first propeller having N1 blades and (b) a second propeller having N2 blades, wherein N1 and N2 are selected such that sequential blade crossings are not adjacent. N1 and N2 represent unequal blade numbers and differ by two and preferably have no common denominator. Furthermore the first propeller comprises more blades than the aft second propeller. Generally, the greater the number of blades in the first propeller the less noise is generated by the second propeller cutting through the more numerous, but smaller wake vortices. However, there is a compromise to consider between weight and aerodynamic performance requirements.

Whereas this arrangement of contra-rotating blade arrays may generate less noise than other arrangements, recent aircraft noise restrictions are significantly more stringent and hence further noise reductions are required.

Therefore it is an object of the present invention to provide a gas turbine engine having a contra-rotating pair of aircraft propellers that produces less noise for a given power rating.

In accordance with the present invention a method of operating a contra-rotating propeller engine having front and rear propellers, wherein the engine is operated during at least a take-off, a climb, a cruise phase and an approach phase, during the cruise phase the engine operates with a generally constant propeller tip speed, the method is characterised by the step of operating the tip speed of at least one of the propellers, during at least one of take-off, climb or approach at a greater tip speed than cruise tip speed.

Preferably, the tip speed of both propellers is greater than cruise tip speed.

Advantageously, the tip speed of the propeller(s), during at least one of take-off, climb or approach, is at least 10% greater than cruise tip speed.

Preferably, the tip speed of the propeller(s), during at least one of take-off or approach, is 20%+/−5% greater than cruise tip speed.

Preferably, the propellers comprise variable pitch blades, the method comprising the step of closing the blades from their cruise pitch to their approach pitch.

Preferably, the propellers comprise variable pitch blades, the method comprising the step of opening the blades from their take-off pitch to their cruise pitch.

In another aspect of the present invention there is provided a contra-rotating propeller engine having front and rear propellers, the front propeller having at least 9 blades (Nf=9) and a diameter Df, the rear propeller having a maximum number of blades, Nr=Nf minus at least 3, the front and rear propellers are separated by an axial gap x, characterised in that the ratio x/Df is between 0.15 and 0.4.

Preferably, the front propeller has 12 blades and the rear propeller has 9 blades.

Alternatively, the front propeller has 12 blades and the rear propeller has 7 blades.

Alternatively, the front propeller has 12 blades and the rear propeller has 5 blades.

Advantageously, the front propeller has a greater diameter that the rear propeller. Preferably the diameter of the rear propeller is between 0.05 Df and 0.2 Df less than the front propeller.

The present invention will be more fully described by way of example with reference to the accompanying drawings in which:

FIG. 2 is a schematic view of an array of blades of a propeller illustrating rotor-alone noise;

FIG. 3 is a schematic view of an array of blades of a propeller illustrating a rapidly decaying potential aerodynamic flow field;

Figure 1:
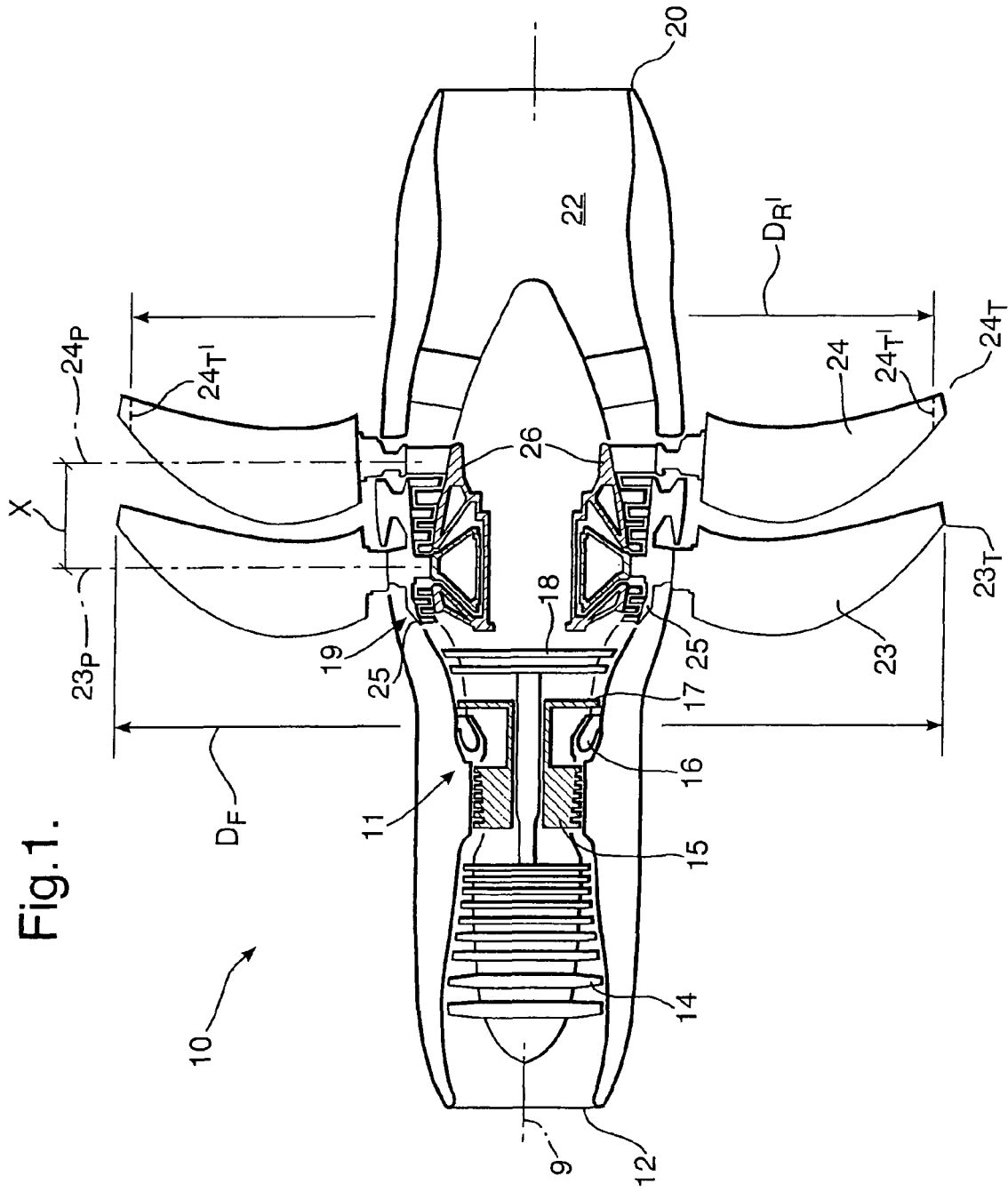
FIG. 1 is a schematic section of gas turbine engine having a contra-rotating pair of propellers in accordance with the present invention.

Referring to FIG. 1, a twin-spooled, contra-rotating propeller gas turbine engine is generally indicated at 10 and has a principal and rotational axis 9. The engine 10 comprises a core engine 11 having, in axial flow series, an air intake 12, an intermediate pressure compressor 14 (IPC), a high-pressure compressor 15 (HPC), combustion equipment 16, a high-pressure turbine 17 (HPT), low pressure turbine 18 (IPT), a free power turbine 19 (LPT) and a core exhaust nozzle 20. A nacelle 21 generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26.

The gas turbine engine 10 works in a conventional manner so that air entering the intake 13 is accelerated and compressed by the IPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust.

The propeller arrays 23, 24 are separated by an axial spacing x, between front and rear pitch change axes $23_p$ and $24_p$ respectively. Usually the diameter of the arrays 23, 24 is approximately the same, however, different diameters may be used whilst staying within the scope of the present invention.

In a preferred embodiment, the front propeller 23 is designed with 12 blades; the rear propeller 24 is designed with 9 blades. The axial separation x between the front and rear pitch change axes $23_p$ and $24_p$ is a quarter of the front propeller's diameter $D_f$ (i.e. $x=D_f/4$).

The main noise tonal sources are rotor-alone tones 30, generated by each blade array 23, 24 (see FIG. 2) and, additionally, the tones 32 generated by the interaction between the aerodynamic flow fields around each blade array 23, 24. The flow field 32 consists of both "potential" and viscous components. The present invention consists of modifying the speed of the blade's tip $23_T$, $24_T$ at takeoff, climb and/or approach to optimise (minimise) the drag of the blade arrays 23, 24, thus reducing the strength of wakes 34 from each blade and, thereby, reducing noise generated by the wake 34 interacting with the downstream blades 24 and ambient.

The additional noise sources (tones 32) are controlled by a suitable choice of blade numbers on both front and rear arrays 23, 24; a suitable choice of axial gap x (FIG. 1); and a suitable choice of blade tip speed. The strength of the potential field 32 (from either array 23, 24) varies as:

$$\exp\left(-2B\frac{\Delta x}{Df}\right) \quad (1)$$

where B is the number of blades, $\Delta x$ is the change in the axial distance between the two rows from that in the preferred embodiment and Df is the diameter of the front propeller 23. This relationship can be used to determine suitable variations from the preferred embodiment due to changes in blade number and separation. In addition, the (most) important first harmonic of rotor alone noise varies with blade number and tip speed as $$\frac{1}{BM_t(1-M_t^2)}\exp\left\{-B\left[\ln\left(\frac{1+\sqrt{1-M_t^2}}{M_t}\right)-\sqrt{1-M_t^2}\right]\right\} \quad (2)$$

where $M_t$ is the blade's tip rotational Mach number. By using the expressions in equations (1) and (2) above it is possible to vary blade number(s), blade tip speed(s) and the blade-to-blade axial gap x to reduce the noise from both potential field interactions and the individual rotor blades to a level well below that of the noise produced from the wake interaction between the front and rear blade arrays 23, 24.

The increased number of blades ensures that the "rotor-alone" noise (i.e. the noise that each row would make, even if it were operating in isolation from the other row) from each propeller (both front and rear) is significantly reduced. The appropriate (higher) blade numbers also ensure that the potential aerodynamic flow field around each propeller is reduced in strength; that fact, combined with the appropriate (increased) axial gap x, in accordance with the present invention, between the front and rear arrays 23, 24, ensures that the noise, generated by the aerodynamic interaction between either blade array and the "potential field" of the other, is greatly reduced, relative to the remaining (significant) noise source, which is caused by the interaction between the rear array 24 and the viscous/vortical wakes 34 emanating from the front array 23.

It should be appreciated that in normal design practice, a propeller is designed for a particular tip speed, and then maintains substantially the same tip speed throughout the flight envelope. The blade's pitch is changed to vary the loadings (thrust) as required through different sections of the flight cycle where the flight speed of the aircraft changes.

The Applicant has found that the noise level, and far-field noise directivity, of wake/rear array 24 interaction can be controlled to some extent by the choice of blade numbers in each array 23, 24. A contra-rotating propeller with equal, or nearly equal, blade numbers on the front and rear arrays 23, 24 produces a strong directivity with high noise both directly fore and aft. A propeller with a difference of 2 or more in each array's blade numbers produces lower peak noise levels and a smoother fore-aft directivity pattern. The combination of 12 blades on the front propeller 23 and 9 on the rear 24 maintains high front and rear blade numbers and has a blade number difference of 3 capable of producing the required smooth directivity. The higher blade numbers on the front array 23 produce relatively smaller viscous wakes 34, which decay more quickly downstream.

Figure 4:
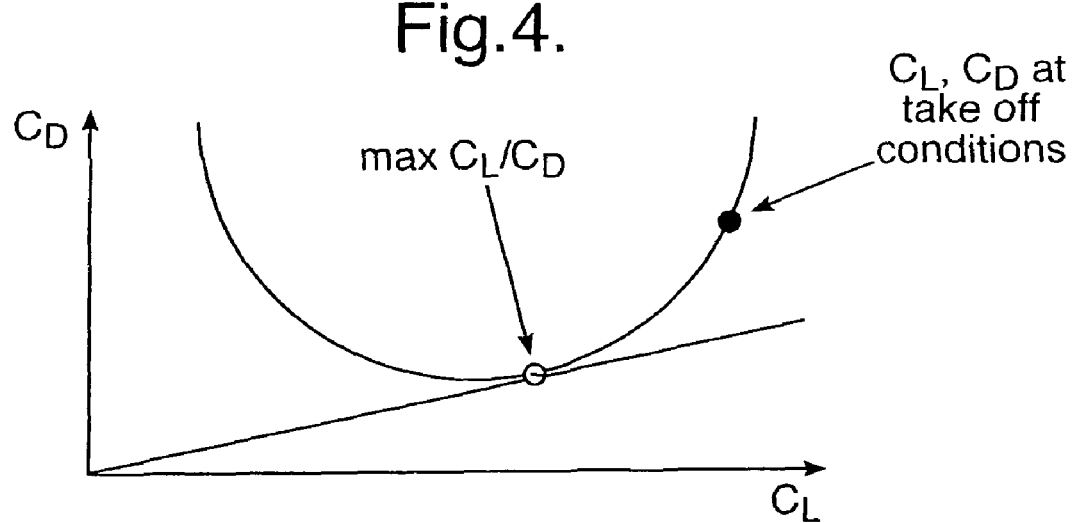
FIG. 4 is a typical propeller blade lift-drag curve.

Once the required blade numbers and axial gap x have been selected, the only remaining noise source of significance is due to the wake 34 interaction with the downstream array 24. This noise source can be reduced substantially if the blade tip speeds are (aerodynamically) optimum at takeoff, climb and approach conditions. Normal practice would be to design each propeller for a suitable tip speed at cruise conditions (high forward speed and high altitude) and then to design the blade sections to maximise the lift-drag ratio $C_L/C_D$, where $C_L$ is the section lift coefficient and $C_D$ is the section drag coefficient, FIG. 4. If the blade tip speed is maintained at takeoff (or approach) conditions, as is the usual design practice, then the propeller blade section lift coefficient increases (relative to that at cruise conditions), resulting in a significant (greater than proportionate) increase in the propeller blade section drag coefficient. Although the increase in drag is not too significant for performance (since it only happens over a small part of the entire flight cycle) the increase is significant for noise as it governs the strength of the 'wake' part of the aerodynamic interaction between the propeller blade row and any downstream blade row or static structure—such as any static part of the engine or airframe downstream of the rear blade row including, but not restricted to, aerofoil sections such as pylons or wings.

Thus, by increasing propeller tip speed of the front and/or rear propellers 23, 24 at takeoff, climb and/or approach relative to cruise tip speeds, though counter-intuitive, results in a decrease in noise (or, at least, in the wake interaction component of the total noise) as the decrease in wake strength, and its impact on the resultant noise generated by the interaction between the wakes 34 and the downstream blade array 24 or downstream static structure, more than offsets the effect of the higher tip speed on noise.

The previously described rationale also applies to a propeller particularly, but not exclusively, with a range of blade numbers between 11-15 on the front array 23, and with blade numbers between 5-10 on the rear array 24. Preferably, the difference in blade numbers being at least 3, although a greater difference would also provide benefits. It also applies to contra-rotating propellers with a range of axial gaps x/D=0.15 to x/D=0.4. The appropriate choice of front and rear array blade numbers and the axial gap can be determined, relative to the datum, from the formulae (1) and (2) above.

Two other specific blade numbers for the front and rear propeller arrays 23, 24 are firstly 12 and 5 and secondly 12 and 7 respectively. These two blade number combinations provide much of the benefit of the 12 and 9 configuration (sufficiently high blade numbers to reduce the rotor-alone components of noise, the noise generated by potential field interactions, and wake interaction noise via an increase in tip speed) and ensures that there are no simultaneous and/or adjacent interactions between the front and rear propeller 23, 24 blades.

Thus the present invention lends itself to a method of operating a contra-rotating propeller engine wherein during the cruise phase the engine operates with a generally constant propeller tip speed, and by increasing the tip speed of one or both of the propellers 23, 24 during take-off, climb or approach to a speed greater than cruise speed. The Applicant believes that noise reduction advantages will be apparent where the tip speed at take-off, climb or approach is greater than cruise tip speed and becomes particularly significant where the tip speed at take-off, climb or approach is at least 10% greater than cruise tip speed and has an optimum noise reduction at tip speeds of 20%+/−5% greater than at cruise.

Figure 5:
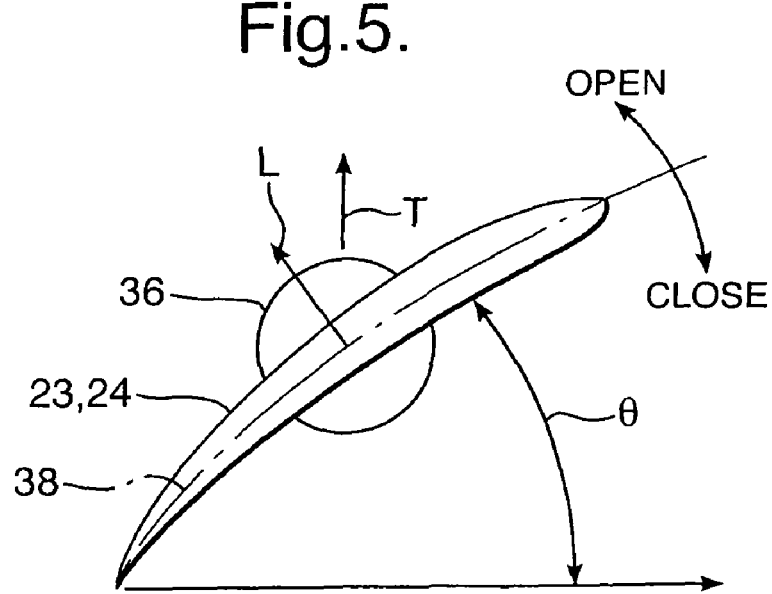
FIG. 5 is a schematic end view on a variable pitch blade.

While increasing the tip speed of the blades of either or both propellers 23, 24, there may be a desire to adjust the amount of thrust produced and it should be apparent to the skilled person that the engine and its operation includes variable pitch blades. Referring to FIG. 5, a blade 23, 24 is mounted on a bearing hub 36, which may be rotated to vary the pitch angle θ. The blades produce both thrust T and lift L. When the tip speed at take-off, climb or approach is increased to greater than the cruise design tip speed, the blades are rotated closed or "fine pitch", relative to those that would be required on a design without a tip speed increase. The blade drag is decreased significantly by the increase in blade speed accompanied by some decrease in the blade lift coefficient (though the lift itself does not need to vary). However the combination of an increase in tip speed and an appropriate change in blade pitch is used to ensure that the propeller achieves its lift and thrust requirements.

As an alternative to reducing community noise, the engine according to the present invention may be operated at a higher performance level than otherwise at a given and acceptable noise level. An additional advantage is that the associated aircraft will be capable of reaching a higher altitude more quickly, therefore reducing the perceived noise levels on the ground.

The present invention is described and shown with the front and rear propeller arrays 23, 24 having approximately the same diameter, however, either array 23, 24 may have a greater diameter than the other. In particular the rear propeller 24 is designed with a smaller diameter than the front propeller 23. This can be seen, in FIG. 1, by the dashed line $24_T{}'$ and propeller diameter $D_R{}'$. It is understood that a particularly strong vortex or wake is generated and shed from the radially outward tip $23_T$ of the front propeller blades. A strong noise source is generated by the downstream rear propeller 24 cutting through this tip generated vortex. Thus designing the rear propeller 24 to partially or completely avoid cutting through the tip generated vortex or wake advantageously reduces noise still further.

It should be understood that the amount by which the rear row diameter is reduced will depend on the strength and size of the vortex or wake and the distance between propellers 23, 24. Also the upstream propeller 23 blade's configuration, particularly at its tip, and the pitch of each blade will determine the strength and size of the vortex or wake. Furthermore, the operating conditions of the engine and flight mode of the aircraft will all be factors in the generation of the tip vortices or wakes. As an exemplary embodiment, the front and rear propellers 23, 24 are separated by an axial gap x between 0.15 Df and 0.4 Df, the diameter of the rear propeller may be reduced by between 0.05 Df and 0.2 Df respectively.

Whereas the present invention has been described with reference to a gas turbine engine, the present invention may also be implemented with a diesel, petrol, fuel cells or other engines capable of driving contra-rotating propeller arrays.

The invention claimed is:

1. A method of operating a contra-rotating propeller engine having front and rear propellers, wherein the engine is operated during at least a take-off, a climb, a cruise phase and an approach phase, during the cruise phase the engine operates with a generally constant propeller tip speed, the method comprising a step of operating the tip speed of at least one of the propellers, during at least one of take-off, climb or approach at a greater tip speed than cruise tip speed.

2. A method according to claim 1 wherein the tip speed of both the propeller(s) is greater than cruise tip speed.

3. A method according to claim 1, wherein the tip speed of the propeller(s), during at least one of take-off, climb or approach, is at least 10% greater than cruise tip speed.

4. A method according to claim 1, wherein the tip speed of the propellers, during at least one of take-off or approach, is 20%+/−5% greater than cruise tip speed.

5. A method according to claim 1 wherein the propellers comprise variable pitch blades, the method further comprising a step of closing the blades from their cruise pitch to their approach pitch.

6. A method according to claim 1 wherein the propellers comprise variable pitch blades, the method further comprising a step of opening the blades from their take-off pitch to their cruise pitch.

7. A contra-rotating propeller engine having front and rear propellers, the front propeller having at least 9 blades (Nf=9) and a diameter Df, the rear propeller having a maximum number of blades, Nr=Nf minus at least 3, the front and rear propellers are separated by an axial gap x, wherein the ratio x/Df is between 0.15 and 0.4.

8. A contra-rotating propeller engine as claimed in claim 7, wherein the front propeller has 12 blades and the rear propeller has 9 blades.

9. A contra-rotating propeller engine as claimed in claim 8, wherein the front propeller has 12 blades and the rear propeller has 7 blades.

10. A contra-rotating propeller engine as claimed in claim 8, wherein the front propeller has 12 blades and the rear propeller has 5 blades.

11. A contra-rotating propeller engine as claimed in claim 7, wherein the front propeller has a greater diameter that the rear propeller.

12. A contra-rotating propeller engine as claimed in claim 11, wherein the diameter of the rear propeller is between 0.05 Df and 0.2 Df less than the front propeller.

* * * * *